United States Patent Office 3,188,199
Patented June 8, 1965

3,188,199
PROCESS FOR RECOVERING LEAD FROM
BY-PRODUCT LEAD MATERIALS
Edwin L. Mattison, Newark, Del., and Richard Wolfe, Wenonah, N.J., assignors to E. I. du Pont de Nemours and Company, Wilmington, Del., a corporation of Delaware
No Drawing. Filed June 25, 1962, Ser. No. 205,075
8 Claims. (Cl. 75—77)

This invention relates to an improved process for recovering metallic lead from by-product lead materials of the character of those obtained in the manufacture of tetraalkyllead compounds by the reaction of an alkyl chloride with lead monosodium alloy.

Tetraethyllead has been manufactured commercially for many years by reacting an excess of ethyl chloride with lead monosodium alloy. Recently, tetramethyllead has been similarly manufactured employing methyl chloride in place of ethyl chloride. The conditions for the reaction of methyl chloride with the lead monosodium alloy differ from those for the reaction of ethyl chloride with the alloy by having present in the reactor charge per 100 parts of alloy from about 1 to about 2.5 parts by weight of graphite, about 0.7 part of aluminum chloride, and about 4 parts of toluene. The graphite acts as a lubricant and reduces the load on the agitator during the reaction, the aluminum chloride is a catalyst for the methylation of the lead, and the toluene serves to decrease the decomposition rate of the tetramethyllead formed in the reaction. In these reactions, the sodium in the alloy is mostly converted to sodium chloride, about 25% of the lead in the alloy is converted to a tertaalkyllead, and most of the rest of the lead in the alloy is converted to metallic lead in finely divided form. As conducted according to modern technology, less than 5%, usually about 1% to about 2%, by weight of the alloy is unconverted and is present in the reaction mass.

After the reaction has been completed, the excess alkyl chloride (i.e., methyl chloride or ethyl chloride) is distilled off. The reaction mass is then drowned in water, and the tetraalkyllead is removed by steam distillation in the presence of a still aid, usually sodium thiosulfate ($Na_2S_2O_3$), which largely prevents agglomeration of the finely divided metallic lead particles. The still residue comprises a suspension of the by-product lead particles in an aqueous solution of sodium chloride and sodium hydroxide formed by the hydrolysis of any unconverted alloy. This suspension is conveyed to a sludge pit by means of a high pressure water stream where it is allowed to settle to form an upper layer of aqueous solution of salt and sodium hydroxide and a lower layer of wet sludge. The water layer is drawn off, leaving a wet sludge which is composed of about 81% to about 91% by weight of finely divided lead mixed with about 9% to about 19% by weight of the aqueous salt and caustic solution. In such procedure conducted according to modern practice, there is added to the reaction mixture a total of about 10,000 lbs. of water for each charge of 3500 lbs. of alloy. This water dissolves the sodium chloride and the sodium hydroxide in the reaction mixture and, when drawn off from the sludge, carries nearly all of the salt and the caustic wtih it. Thus, the wet sludge contains only very small amounts of sodium chloride and about 0.05% by weight or less of sodium hydroxide, present in the 9–19% water retained in the wet sludge.

The resulting wet by-product lead sludge from the reaction with ethyl chloride contains (by weight) about 84% ±5% lead, about 14% ±5% water, and about 2% of impurities comprising mainly sodium chloride, minor amounts of lead oxide, lead sulfide (from reaction with the sodium thiosulfate), and lead chloride, and a trace of sodium hydroxide. The wet by-product lead sludge from the reaction with methly chloride contains (by weight) about 81% ±5% lead, about 14% ±5% water, about 3% ±1.5% graphite and aluminum hydroxide, and about 2% of other impurities comprising mainly sodium chloride, minor amounts of lead oxide, lead sulfide and lead chloride, and a trace of sodium hydroxide. By "a trace of sodium hydroxide" is meant a caustic content of the order of about 0.05% by weight or less on the basis of the lead content of the sludge. Calculation shows, and analysis confirms, that for each percent of unconverted alloy in the reaction an average of 0.01% of sodium hydroxide based on the lead content remains in the lead sludge. Accordingly, a sodium hydroxide content in the lead sludge of as much as 0.1% would result from unconverted alloy amounting to about 10%, a condition that never exists in the present day manufacture of a tetraalkyllead.

The usual procedure for recovering the lead from such wet by-product lead sludges has involved drying the wet sludge in a continuously operating drier to reduce the water content to about 1–6%, and then melting it at a temperature of at least 700° C. in a reverberatory furnace. The sludge, particularly from the manufacture of tetraethyllead, is difficult to agitate efficiently and causes frequent high overloads in continuous drying equipment, resulting in interruptions and loss of production efficiency in the drying operation.

A long standing problem has been the recovery of the lead from the dried by-product lead sludge in a single step by a practical process that will produce a slag residue of sufficiently low lead content to be discarded without further refinement. Difficulties have been caused by a low melting rate of the lead in the finely divided sludge, by the solubility of the impurities in the lead at the furnace temperatures required to melt the by-product lead, and by the failure of the metallic lead to separate cleanly from the impurities, whereby furnace slag always contianed too much free lead to be discarded. Due to the low melting rate of the lead, the recovery processes had a relatively low throughput of lead sludge. Since the solubility of the impurities, such as lead oxide and lead sulfide, in molten lead increases rapidly as the temperature is increased above 500° C. and the furnace temperature is at least 700° C., the recovered lead contained objectionable amounts of those impurites, whereby it had to be treated further to remove those impurities, and considerable amounts of dross containing those impurities were produced in lead melt pots and casting molds. Also, the slag and dross by-products require further treatment, for example, in a blast furnace, to complete the recovery of the lead. Furthermore, in the furnace treatment of lead sludge from the manufacture of tetraethyllead, the slag consists of solid crusts of material which are objectionable. In the furnace treatment of lead sludge from the manufacture of tetramethyllead, the slag consists of a thick layer of dusty material which is difficult to handle.

Various processes have been proposed heretofore for overcoming the foregoing difficulties. One such proposed process for refining the impure by-product lead sludge comprises treating the sludge with molten sodium hydroxide to form a lower layer of molten metallic lead and an upper layer of molten caustic containing the slag materials. This process is described by Denison in U.S. Patent No. 2,692,197. The mixture of lead sludge and at least 2% by weight of sodium hydroxide is heated at 327° C. to about 450° C. in a melt pot. Under these conditions, the lead is melted and forms a lower layer beneath a layer of molten sodium hydroxide and lead impurities. The process is, however, relatively slow owing to the low temperatures maintained, it uses too high an amount of sodium hydroxide for best economy, and, most disadvantageous, the slag must be further refined to recover the lead contained therein.

Another proposed recovery process is the treatment of lead oxide slag materials with 50% to 200% by weight of sodium hydroxide and 10% to 30% by weight of metallic sodium based on the lead oxide content and heating at 327° C. to 450° C. This process is disclosed by Larson in U.S. Patent No. 2,691,575. Such a process is effective for recovering most of the lead in the slag mixture, but it forms a second operation, requires additional agents, and leaves appreciable amounts of recoverable lead in the slag. Neither this process nor that of Denison can be operated in the existing conventional reverberatory furnaces because the fused caustic in the large amounts employed severely and rapidly attacks the ceramic linings of the furnaces.

A process for the treatment of lead sludge and slag materials with fused sodium cyanide to effect coalescence of the metallic lead globules into a lower layer of molten lead in a reverberatory furnace is disclosed by Kreimeier in U.S. Patent No. 2,899,296. While the process is effective in reducing the lead content of the lead sludge, too much free lead remains suspended in the slag, owing to the highly viscous nature of the slag, to permit its discard without further treatment to recover more of the lead. Furthermore, the hazards in the use and disposal of sodium cyanide lessen the value of this process in practice.

A further proposed process for the recovery of lead from by-product lead material in a reverberatory furnace calls for the heating of the by-product lead in the presence of carbon and a flux consisting of sodium carbonate, potassium carbonate, and sodium chloride. This process is described by Peters in U.S. application, Serial No. 57,-146, now Patent No. 3,052,535, filed September 20, 1960. While effective and producing a fluid upper layer of slag which may be disposed of as waste without further treatment, the process is not economical. The cost of materials for the flux adds appreciably to the cost of the process. The slag by-product amounts to 8% to 10% of the lead sludge and contains recoverable lead. The slag, although fluid, is a viscous fluid and often has to be mechanically assisted from the furnace to maintain a practical flow of sludge through the furnace.

It is an odject of this invention to provide a new and improved process for recovering metallic lead from by-product lead materials of the character of those obtained in the manufacture of tetraalkyllead compounds. Another object is to provide a process which permits the recovery of the metallic lead in a more facile and rapid manner and particularly produces the metallic lead in a condition of higher purity, together with a material decrease in the amount of slag formed. A further object is to provide a simplified process whereby a higher recovery of lead is obtained in fewer steps and in a more economical manner. Other objects are to advance the art. Still other objects will appear hereinafter.

The above and other objects may be accomplished by the process for recovering lead from by-product lead of the character of that obtained by the reaction of an alkyl chloride with lead monosodium alloy which comprises (a) Mixing by-product lead which consists essentially of about 76% to about 89% by weight of finely divided metallic lead, about 9% to about 19% by weight of water, up to 0.05% by weight of sodium hydroxide, and small amounts up to about 2% by weight of lead oxide and lead sulfide, (b) With 0.4% to about 1.2% by weight of sodium hydroxide based on the metallic lead, (c) Drying the mixture by heating it at about 100° C. to about 160° C. with agitation until the water content is reduced to about 1% to about 6% by weight, (d) Heating the dried mixture in a reverberatory furnace at a temperature of from about 650° C. to about 1200° C. until the metallic lead is molten, and (e) Separating the molten lead from the reaction mixture.

It has been found that, by the above defined process, the problems previously encountered in the recovery of lead from such by-product lead materials have been largely overcome. By the addition of the sodium hydroxide to the wet sludge prior to drying it, particularly with sludge obtained in the manufacture of tetraethyllead, the tendency for high overloads of the drier equipment and the frequent interruptions of its operation, has been greatly reduced, whereby the efficiency and rate of production in the drying operation are materially improved. Also, the drying operation efficiently mixes the added sodium hydroxide uniformly with the by-product lead material.

The added sodium hydroxide in the dried sludge improves the thermal conductivity thereof so that the rate of melting of the lead of the sludge in the furnace is greatly increased, resulting in production rate increases of about 25% to about 30%. Also, at the furnace temperature, the added caustic soda promotes the reaction between the lead oxide and the lead sulfide to produce metallic lead in accord with the following equation:

$$2NaOH + 2PbO + PbS \rightarrow 3Pb + Na_2SO_3 + H_2O$$

Thereby, the lead oxide and the lead sulfide are largely eliminated, and the amounts of slag and dross produced by the furnace operation are reduced by about 65% to about 70% of the amounts obtained in the absence of the added sodium hydroxide. The above reaction, eliminating the lead oxide and the lead sulfide, does not take place to any material extent at temperatures below 500° C. even in the presence of large excesses of sodium hydroxide, such as in the process of U.S. Patent 2,692,197.

The reduction in the amount of slag so obtained represents a reduction in the amounts of suspended metallic lead and of lead compounds, e.g., lead oxide and lead sulfide, in the slag, whereby the slag does not contain economically recoverable amounts of lead and it can be discarded as waste. Thus, the process of this invention eliminates the necessity for treating slag materials in a blast furnace for the recovery of lead values therefrom.

Where the by-product lead sludge treated is that obtained from the manufacture of tetraethyllead, the slag that is formed in the process of this invention is a very fluid-liquid layer which is readily run off from the furnace and cleanly separated from the molten lead. When the sludge treated is that obtained in the manufacture of tetramethyllead and contains graphite and aluminum hydroxide, the slag that forms in the process of this invention is a mushy material which is essentially dust-free and is readily hoed from the furnace and separated from the molten lead. The dried mixture of sludge and added sodium hydroxide, when fed to the furnace, readily spreads over the surface of the material in the furnace and melts rapidly into lead and a slag layer. The changes in the furnace operation are marked, clearly visible, and well defined.

The lead produced by the process of this invention is clean and bright and, on cooling, produces only a skin of drossy material. Such metallic lead is of high quality and purity, being substantially free of lead oxide and lead sulfide, and does not require further purification prior to its use in the manufacture of tetraalkyllead compounds. When "hogs" of metallic lead produced by the process of this invention are charged to a melt pot for use in the manufacture of lead monosodium alloy, the amount of dross produced in the pot is 65% to 75% less than that obtained from metallic lead recovered in the absence of the added sodium hydroxide. This results in further economies in decreasing the amounts of dross materials which must be treated to recover the lead values therein.

The by-product lead materials which are to be treated by the process of this invention are of the character of those obtained by the reaction of an alkyl chloride with lead monosodium alloy and consist essentially of about 76% to about 89% by weight of finely divided metallic lead, about 9% to about 19% by weight of water, up to 0.05% by weight of sodium hydroxide and small amounts up to about 2% by weight of lead oxide and lead sulfide. Such by-product lead materials include the wet by-product lead sludges obtained in the manufacture of tetraethyllead and those obtained in the manufacture of tetramethyllead. The wet by-product lead sludges obtained in the manufacture of tetraethyllead will contain about 79% to about 89% by weight of finely divided metallic lead, usually about 84%; about 9% to about 19%, usually about 14% by weight of water; up to about 0.05%, usually about 0.01% to about 0.02% by weight of sodium hydroxide; small amounts up to about 2% by weight of lead oxide and lead sulfide, usually about 0.1% to about 0.5% of lead oxide and about 0.05% to about 0.3% of lead sulfide; and less than 2% by weight of other impurities, mainly sodium chloride, and smaller amounts of lead chloride and the like. The wet by-product lead sludges obtained from the manufacture of tetramethyllead will contain about 76% to about 86% by weight of finely divided lead, usually about 81%; about 9% to about 19%, usually about 14% by weight of water; about 1.5% to about 4.5%, usually about 3% by weight of graphite and aluminum hydroxide combined; up to about 0.05%, usually about 0.01% to about 0.02% by weight of sodium hydroxide; small amounts up to about 2% by weight of lead oxide and lead sulfide, usually about 0.1% to about 0.5% of lead oxide and about 0.05% to about 0.3% of lead sulfide; and less than 2% by weight of other impurities, mainly sodium chloride, and smaller amounts of lead chloride and the like.

The amount of sodium hydroxide, which is added to the wet by-product lead sludges of this invention, will be from 0.4% to about 1.2% by weight based on the metallic lead present in the by-product lead material. Materially less than 0.4% of sodium hydroxide is insufficient to produce the desired results, and materially more than 1.2% of sodium hydroxide attacks the ceramic linings of the furnace to such an extent as to render the process impractical. In the treatment of the wet by-product lead sludges obtained in the manufacture of tetraethyllead, it will usually be desirable to add the sodium hydroxide in the range of about 0.5% to about 0.7% by weight for optimum results, the preferred amount being about 0.6%. In the treatment of wet by-product lead sludge obtained from the manufacture of tetramethyllead, it will generally be necessary to employ larger proportions of sodium hydroxide for optimum results and effective separation of the molten lead from the sludge due to the presence of the graphite and the aluminum compounds present in the sludge. Thus, for optimum results in the treatment of wet by-product lead sludges from the manufacture of tetramethyllead, the added sodium hydroxide usually should be in the proportion of about 0.9% to about 1.1% by weight based on the metallic lead in the sludge, preferably about 1%. The sodium hydroxide may be added to the by-product lead materials in anhydrous flake form. However, it will generally be desired to add the sodium hydroxide in the form of an aqueous solution because of the ease of handling and metering such solutions. Preferably, the sodium hydroxide will be added as a 30% by weight solution in water.

The mixture of wet by-product lead material and sodium hydroxide is dried by heating it at a temperature of about 100° C. to about 160° C., preferably about 110° C. to about 120° C., with agitation, until the water content is reduced to about 1% to about 6% by weight, usually to about 2% to about 5%, so that no hazard will be involved from excessive amounts of water entering the furnace. Such drying operation is conventionally carried out in a continuously operating, steam heated drier containing an interrupted screw type of agitator for agitating the mixture being dried and conveying it through the drier. Usually, the sodium hydroxide will be added to the wet by-product lead sludge at the entrance of the drier so that the drier will also function to mix the caustic into the sludge and produce a uniform mixture thereof.

The dried mixture of by-product lead material and sodium hydroxide is conveyed into the firing end of a reverberatory furnace where it is heated at a temperature of about 650° C. to about 1200° C., usually about 700° C. to about 1000° C., until the metallic lead is molten and the lead oxide and the lead sulfide are converted to molten metallic lead. One form of a reverberatory furnace, which is suitable for carrying out the process of this invention, is that disclosed by Kreimeier in U.S. Patent 2,899,296.

When the mixture of by-product lead material and sodium hydroxide is first introduced into the furnace, it floats on a body of molten lead. The mixture is melted from heat absorbed from the flame directly above it and from the molten lead. The presence of the sodium hydroxide in the mixture increases the rate of heat absorption due to the increase in the thermal conductivity of the mixture, whereby the mixture is substantially all melted after it floats a short distance into the furnace. At this time, the fluid slag formation begins, together with the conversion of the lead oxide and lead sulfide to metallic lead. Where the by-product lead material is that obtained in the manufacture of tetraethyllead, the slag becomes completely fluid at temperatures of 650° C. to about 750° C., and the resulting slag contains about 3% to about 5% by weight of lead as compared to about 70% to about 85% by weight of lead in slag produced in the absence of the added sodium hydroxide. The amount of slag, produced by the process of this invention per 100 lbs. of recovered lead from wet by-product lead sludge obtained in the manufacture of tetraethyllead, is usually about 1.5 lbs.; and that, from wet by-product lead sludge obtained in the manufacture of tetramethyllead, is about 4 lbs. to about 6 lbs.

It is a further feature of this invention that lead drosses containing lead sulfide and lead oxide can be added to the by-product lead sludges in a proportion of up to about 10% by weight of the by-product lead sludge and fed to the furnace therewith. As little as 0.5% by weight of dross can be used economically, but it usually will be preferred to use about 2% to about 10%. Under such conditions, the lead oxide and lead sulfide in the dross are effectively converted to metallic lead, and the lead in the dross is recovered with the lead from the sludge and will be of such high quality and purity that it is acceptable for use in the manufacture of lead monosodium alloy and tetraethyllead without further purification. Such treatment of the dross with the by-product lead sludge in the process of this invention does not introduce any serious problems into the process or materially increase the amount or seriously alter the character of the slag produced.

The lead drosses which can be so used are obtained in the melting and casting of recovered lead and usually consist essentially of about 86% to about 97% of metallic lead, about 8% to about 2% of lead oxide and about 6% to about 1% of lead sulfide. When the lead dross is sufficiently finely divided, it is preferred to add it to the wet by-product lead sludge before said sludge is dried. However, such drosses are frequently obtained in chunks which cannot be passed through the drier, in which event the dross may be added to the furnace with the dried mixture of by-product lead sludge and sodium hydroxide.

In order to more clearly illustrate this invention, preferred modes of carrying it into effect and the advantageous results to be obtained thereby, the following examples are given, in which the parts and proportions are by weight except where specifically indicated otherwise.

Example 1

In a series of experiments, stoichiometric quantities of lead oxide (2 moles) and lead sulfide (1 mole) were heated in the presence of 2 moles of sodium hydroxide to various temperatures. At temperatures below 500° C., there is negligible reaction between lead oxide, lead sulfide and sodium hydroxide. At 650° C., the reaction proceeds at a rapid rate. The reaction is:

$$2PbO + PbS + 2NaOH \rightarrow 3Pb + Na_2SO_3 + H_2O$$

In the absence of the sodium hydroxide, no appreciable reaction of lead oxide and lead sulfide occurs at 650° C.

Example 2

Wet by-product lead sludges, produced in the manufacture of tetraethyllead, were treated with sodium hydroxide, dried, and smelted continuously for a month. The composition of the sludges during this time varied within the following limits:

|   | Percent |
|---|---|
| Water | 8 to 17. |
| Sodium chloride | 0.3 to 0.5. |
| Lead oxide | 0.1 to 0.5. |
| Lead sulfide | 0.05 to 0.3. |
| Tetraethyllead | 0.5 to 1.2. |
| Sodium hydroxide | Less than 0.05. |

Balance essentially finely divided metallic lead.

To the wet lead sludges was added 30% aqueous sodium hydroxide solution to provide 0.6 part by weight of dry caustic per 100 parts of metallic lead contained in the sludges. The caustic treated sludges were then mixed and dried to an average water content of 5% by passage through a steam heated (about 110° C. to about 120° C.) cylindrical drier equipped with a plow type conveyer-agitator. From the drier, the sludge mixture was conveyed to a reverberatory furnace of the type described by Kreimeier in U.S. Patent 2,899,296. The furnace was oil-fired to provide an atmospheric temperature varying between 700° C. and 1000° C. The sludge mixture rapidly melted to form a lower layer of molten metallic lead and an upper layer of fluid slag. The molten lead was withdrawn intermittently from the furnace to a hold pot. It was acceptable for reuse in forming monosodium lead alloy for subsequent reaction with ethyl chloride. At the same time, the fluid slag was slopped off with a hoe into a slag hopper. The slag amounted to 1.52 parts by weight per 100 parts by weight of recovered lead and contained 3% to 5% by weight of combined lead, the balance being essentially sodium chloride, sodium hydroxide, sodium carbonate (from $CO_2$ of combustion in the oil-fired furnace reacted with a portion of the sodium hydroxide), sodium sulfite, and sodium sulfide (from reaction of lead oxide and lead sulfide with sodium hydroxide). The dross, skimmed from the surface of the lead in the melt pot, amounted to 0.2 part by weight per 100 parts of lead.

When sodium hydroxide is not added to the wet sludge and the sludge is processed as described above, the slag forms in solid crusts and heaps on the surface of the molten lead, and is removed by raking into a slag hopper. The slag amounts to 2.78 parts by weight per 100 parts by weight of lead. Owing to the solid character of this slag, it tends to retain metallic lead globules so that the lead content of the slag amounts to 75% to 85% by weight and requires that the slag be further refined to recover this lead. The dross, produced from the lead recovered without the aid of added sodium hydroxide, amounts to 0.8 part by weight per 100 parts of lead.

Operating the recovery process with added sodium hydroxide as described, increased the output of the furnace 30%. This increased output results from a faster melting of the sludge. The faster melting is due to a higher thermal conductivity of the caustic treated sludge than that of the untreated sludge. This higher melting rate is shown by laboratory melting rate tests in which untreated sludge of a composition within the range given above had a melting rate whereby 800 gm. of the dry sludge melted in 30 minutes at 700° C. in a small Hoskins furnace, whereas the same sludge with which 0.5% by weight of sodium hydroxide was mixed produced 2260 gm. of molten sludge under the same conditions in the same time.

Example 3

Wet by-product lead sludges, produced in the manufacture of tetramethyllead, were treated with sodium hydroxide, dried, and smelted continuously for a month. The composition of the sludges during this time varied within the limits given below.

|   | Percent |
|---|---|
| Water | 8 to 17. |
| Graphite | 2.0 to 2.2. |
| Aluminum hydroxide | 0.7 to 0.8. |
| Sodium chloride | 0.3 to 0.5 |
| Lead oxide | 0.1 to 0.5. |
| Lead sulfide | 0.05 to 0.3. |
| Tetramethyllead | 0.05 to 0.5 |
| Sodium hydroxide | less than 0.05 |

Metallic lead, finely divided—remainder of material.

To the wet lead sludges was added 30% aqueous sodium hydroxide solution to provide 1.0 part by weight of dry caustic per 100 parts of metallic lead contained in the sludge. The caustic treated sludge was then mixed and dried, and processed in the reverberatory furnace to recover the lead according to the procedure given in Example 2.

The slag produced was a soft, thick, mushy material which was raked from the furnace into a slag hopper. It amounted to 5 parts by weight per 100 parts by weight of lead and contained 20% to 25% by weight of lead, the balance being the components present in the slag of Example 2, plus graphite and aluminum oxide. In the absence of the added sodium hydroxide, the slag is a dusty pulverant material which amounts to 33 parts by weight per 100 parts of lead and contains from 70% to 85% by weight of lead. The amount of sludge smelted in the furnace for lead recovery was 25% greater than that in the absence of the added sodium hydroxide.

Example 4

To the wet caustic treated by-product lead sludge of Example 2 was added, per 100 parts of the sludge, 2.4 parts by weight of melt pot dross consisting essentially of 92% by weight of lead and 8% by weight of a mixture of lead sulfide and lead oxide. The sludge and dross mixture was then processed to recover the lead as described in Example 2. Essentially the same low amount of slag was produced as was formed without the added dross. In particular, the recovered lead is acceptable for monosodium lead alloy production, without further purification, to provide the usual high yield of tetraethyllead on subsequent reaction of the alloy with ethyl chloride. Without the added sodium hydroxide in the sludge to which the dross is added for lead recovery, an inferior quality lead product is obtained. The lead, under the latter conditions, contains appreciable amounts of lead sulfide and lead oxide which are not reduced to metallic lead in the absence of sodium hydroxide. The alloy, made from the lead containing these impurities, reacts with ethyl chloride to give yields of tetraethyllead that are as much as 8% lower than those obtained from alloy prepared from lead free from the lead compounds introduced from dross.

When 10 parts by weight of melt pot dross is added to 100 parts of wet by-product lead sludge, containing 0.6% by weight of added sodium hydroxide on the basis of the lead content of the sludge, and the mixture is mixed, dried, and smelted as described above, an acceptable high quality lead is recovered together with a low amount of throw-away slag.

While by-product lead sludge, containing 0.6% by weight of added sodium hydroxide, was being smelted as in Example 2, dross from lead "hogs" was added directly to the furnace in an amount of 0.5 part by weight per 100 parts of the by-product lead sludge feed. The resulting recovered lead was essentially free from lead compounds. Such procedure is a means of readily recovering the lead contained in the dross. This dross is obtained in chunks and cannot be passed through the drier, but is conveniently added to the furnace.

It will be understood that the preceding examples have been given for illustrative purposes solely and that this invention is not restricted to the specific embodiments described therein. On the other hand, it will be apparent to those skilled in the art that, subject to the limitations set forth in the general description, many variations can be made in the materials, proportions, and conditions employed without departing from the spirit or scope of this invention.

From the preceding description, it will be apparent that this invention provides a novel, improved process for recovering lead from by-product lead materials of the character of those obtained by the reaction of an alkyl chloride with a monosodium lead alloy, whereby there is obtained a more complete recovery of metallic lead of a high quality and purity in a fewer number of steps. The process further results in greatly increased rates of production and very material economies in time and costs. Particularly, it eliminates previously required steps of purification of the recovered lead and of expensive treatments of slag materials for the recovery of lead values contained therein. Accordingly, it will be apparent that this invention constitutes a valuable advance in and contribution to the art.

The embodiments of the invention in which an exclusive property or privilege is claimed are defined as follows:

1. The process for recovering lead from by-product lead of the character of that obtained by the reaction of an alkyl chloride with lead monosodium alloy which comprises
   (a) mixing by-product lead which consists essentially of about 76% to about 89% by weight of finely divided metallic lead, about 9% to about 19% by weight of water, up to 0.05% by weight of sodium hydroxide, and small amounts up to about 2% by weight of lead oxide and lead sulfide,
   (b) with 0.4% to about 1.2% by weight of sodium hydroxide based on the metallic lead,
   (c) drying the mixture by heating it at about 100° C. to about 160° C. with agitation until the water content is reduced to about 1% to about 6% by weight,
   (d) heating the dried mixture in a reverberatory furnace at a temperature of from about 650° C. to about 1200° C. until the metallic lead is molten, and
   (e) separating the molten lead from the reaction mixture.

2. The process for recovering lead from by-product lead of the character of that obtained by the reaction of an alkyl chloride with lead monosodium alloy which comprises
   (a) mixing by-product lead which consists essentially of about 76% to about 89% by weight of finely divided metallic lead, about 9% to about 19% by weight of water, about 0.01% to about 0.02% by weight of sodium hydroxide, and small amounts up to about 2% by weight of lead oxide and lead sulfide,
   (b) with about 0.5% to about 1% by weight of sodium hydroxide based on the metallic lead,
   (c) drying the mixture by heating it at about 110° C. to about 120° C. with agitation until the water content is reduced to about 1% to about 6% by weight,
   (d) heating the dried mixture in a reverberatory furnace at a temperature of from about 700° C. to about 1000° C. until the metallic lead is molten, and
   (e) separating the molten lead from the reaction mixture.

3. The process for recovering lead from by-product lead of the character of that obtained by the reaction of ethyl chloride with lead monosodium alloy which comprises
   (a) mixing by-product lead which consists essentially of about 79% to about 89% by weight of finely divided metallic lead, about 9% to about 19% by weight of water, up to 0.05% by weight of sodium hydroxide, and small amounts up to about 2% by weight of lead oxide and lead sulfide,
   (b) with 0.4% to about 0.7% by weight of sodium hydroxide based on the metallic lead,
   (c) drying the mixture by heating it at about 100° C. to about 160° C. with agitation until the water content is reduced to about 1% to about 6% by weight,
   (d) heating the dried mixture in a reverberatory furnace at a temperature of from about 650° C. to about 1200° C. until the metallic lead is molten, and
   (e) separating the molten lead from the reaction mixture.

4. The process for recovering lead from by-product lead of the character of that obtained by the reaction of ethyl chloride with lead monosodium alloy which comprises
   (a) mixing by-product lead which consists essentially of about 79% to about 89% by weight of finely divided metallic lead, about 9% to about 19% by weight of water, about 0.01% to about 0.02% by weight of sodium hydroxide, and small amounts up to about 2% by weight of lead oxide and lead sulfide,
   (b) with about 0.5% to about 0.7% by weight of sodium hydroxide based on the metallic lead,
   (c) drying the mixture by heating it at about 110° C. to about 120° C. with agitation until the water content is reduced to about 1% to about 6% by weight,
   (d) heating the dried mixture in a reverberatory furnace at a temperature of from about 700° C. to about 1000° C. until the metallic lead is molten, and
   (e) separating the molten lead from the reaction mixture.

5. The process for recovering lead from by-product lead of the character of that obtained by the reaction of methyl chloride with lead monosodium alloy which comprises
   (a) mixing by-product lead which consists essentially of about 76% to about 86% by weight of finely divided metallic lead, about 9% to about 19% by weight of water, up to 0.05% by weight of sodium hydroxide, small amounts up to about 2% by weight of lead oxide and lead sulfide, and about 1.5% to about 4.5% by weight of graphite and aluminum hydroxide combined,
   (b) with 0.4% to about 1.2% by weight of sodium hydroxide based on the metallic lead,
   (c) drying the mixture by heating it at about 100° C. to about 160° C. with agitation until the water content is reduced to about 1% to about 6% by weight,
   (d) heating the dried mixture in a reverberatory furnace at a temperature of from about 650° C. to about 1200° C. until the metallic lead is molten, and
   (e) separating the molten lead from the reaction mixture.

6. The process for recovering lead from by-product lead of the character of that obtained by the reaction of methyl chloride with lead monosodium alloy which comprises
   (a) mixing by-product lead which consists essentially of about 76% to about 86% by weight of finely divided metallic lead, about 9% to about 19% by weight of water, about 0.01% to about 0.02% by weight of sodium hydroxide, small amounts up to amout 2% by weight of lead oxide and lead sulfide, and about 1.5% to about 4.5% by weight of graphite and aluminum hydroxide combined, (b) with about 0.9% to about 1.1% by weight of sodium hydroxide based on the metallic lead,
(c) drying the mixture by heating it at about 110° C. to about 120° C. with agitation until the water content is reduced to about 1% to about 6% by weight,
(d) heating the dried mixture in a reverberatory furnace at a temperature of from about 700° C. to about 1000° C. until the metallic lead is molten, and
(e) separating the molten lead from the reaction mixture.

7. The process for recovering lead from by-product lead of the character of that obtained by the reaction of an alkyl chloride with lead monosodium alloy which comprises
(a) mixing by-product lead which consists essentially of about 76% to about 89% by weight of finely divided metallic lead, about 9% to about 19% by weight of water, up to 0.05% by weight of sodium hydroxide, and small amounts up to about 2% by weight of lead oxide and lead sulfide,
(b) with 0.4% to about 1.2% by weight of sodium hydroxide based on the metallic lead,
(c) drying the mixture by heating it at about 100° C. to about 160° C. with agitation until the water content is reduced to about 1% to about 6% by weight,
(d) heating the dried mixture in a reverberatory furnace at a temperature of from about 650° C. to about 1200° C. until the metallic lead is molten,
(f) adding to the furnace with the dried mixture up to 10% by weight, based on the by-product, lead, of a lead dross which consists essentially of about 88% to about 97% by weight of metallic lead, about 2% to about 8% by weight of lead oxide, and about 1% to about 6% by weight of lead sulfide, and
(e) separating the molten lead from the reaction mixture.

8. The process for recovering lead from by-product lead of the character of that obtained by the reaction of an alkyl chloride with lead monosodium alloy which comprises
(a) mixing by-product lead which consists essentially of about 76% to about 89% by weight of finely divided metallic lead, about 9% to about 19% by weight of water, up to 0.05% by weight of sodium hydroxide, and small amounts up to about 2% by weight of lead oxide and lead sulfide,
(b) with 0.4% to about 1.2% by weight of sodium hydroxide based on the metallic lead, and
(f) with up to 10% by weight, based on the by-product lead, of a lead dross which consists essentially of about 88% to about 97% by weight of metallic lead, about 2% to about 8% by weight of lead oxide, and about 1% to about 6% by weight of lead sulfide,
(c) drying the mixture by heating it at about 100° C. to about 160° C. with agitation until the water content is reduced to about 1% to about 6% by weight,
(d) heating the dried mixture in a reverberatory furnace at a temperature of from about 650° C. to about 1200° C. until the metallic lead is molten, and
(e) separating the molten lead from the reaction mixture.

References Cited by the Examiner
UNITED STATES PATENTS

| | | | |
|---|---|---|---|
| 2,691,575 | 10/54 | Larson | 75—77 |
| 2,692,197 | 10/54 | Denison | 75—78 |
| 2,853,378 | 9/58 | Mattison et al. | 75—78 |
| 2,899,296 | 8/59 | Kreimeier | 75—79 |
| 3,052,535 | 9/62 | Peters | 75—77 |

BENJAMIN HENKIN, *Primary Examiner.*

DAVID L. RECK, *Examiner.*